United States Patent
Lee et al.

(10) Patent No.: US 8,340,440 B2
(45) Date of Patent: Dec. 25, 2012

(54) APPARATUS AND METHOD FOR INSERTING ADDITIONAL DATA INTO IMAGE FILE IN ELECTRONIC DEVICE

(75) Inventors: Sin-Jae Lee, Suwon-si (KR); Jae-Hwan Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1623 days.

(21) Appl. No.: 11/803,557

(22) Filed: May 15, 2007

(65) Prior Publication Data

US 2007/0292035 A1    Dec. 20, 2007

(30) Foreign Application Priority Data

Jun. 7, 2006 (KR) .................. 10-2006-0050882

(51) Int. Cl.
*G06K 9/36* (2006.01)

(52) U.S. Cl. ........ 382/232; 382/233; 382/244; 382/245; 382/250; 382/251; 348/231.99

(58) Field of Classification Search .................. 382/232, 382/233, 244, 245, 239, 305, 250, 251; 348/231.99, 348/231.2, 65; 345/634
See application file for complete search history.

(56) References Cited

U.S. PATENT DOCUMENTS

| | | | | |
|---|---|---|---|---|
| 6,915,012 | B2* | 7/2005 | Osborne et al. | 382/232 |
| 2003/0018978 | A1* | 1/2003 | Singal et al. | 725/115 |
| 2005/0147390 | A1* | 7/2005 | Nakamura et al. | 386/95 |
| 2006/0114514 | A1* | 6/2006 | Rothschild | 358/3.28 |
| 2006/0132620 | A1* | 6/2006 | Takada et al. | 348/231.3 |

FOREIGN PATENT DOCUMENTS

| | | |
|---|---|---|
| JP | 07-121561 | 5/1995 |
| KR | 1020030057991 | 7/2003 |
| KR | 1020040062496 | 7/2004 |
| KR | 1020070023188 | 2/2007 |

* cited by examiner

*Primary Examiner* — Ali Bayat
(74) *Attorney, Agent, or Firm* — The Farrell Law Firm, P.C.

(57) ABSTRACT

Provided is an apparatus and a method for inserting additional data into an image file in an electronic device. According to the method, when an event of inserting additional data into the image file occurs, an identification code representing insertion of additional data is recorded in a corresponding header within the image file, and the additional data is added to an end portion of the image file.

13 Claims, 5 Drawing Sheets

APPARATUS AND METHOD FOR INSERTING ADDITIONAL DATA INTO IMAGE FILE IN ELECTRONIC DEVICE

PRIORITY

This application claims priority under 35 U.S.C. §119 to an application filed in the Korean Intellectual Property Office on Jun. 7, 2006 and allocated Ser. No. 2006-50882, the contents of which are incorporated herein by reference.

BACKGROUND OF THE INVENTION

1. Field of the Invention

The present invention relates generally to an apparatus and a method for inserting additional data into an image file in an electronic device, and more particularly, to an apparatus and a method for inserting additional data using a header within an image file.

2. Description of the Related Art

A Joint Photographic Experts Group (JPEG) is a technology standard for compressing data such as photos and still images in order to more efficiently transmit the data. Though JPEG is a lossy compression type technology standard, JPEG provides relatively high quality for its compression rate and has a variety of applications. JPEG is currently used in a variety of fields such as a web, digital cameras, and portable terminals.

Generally, an image compressed using JPEG includes additional data related to the image together with data of the image itself according to an Exchangeable Image File (EXIF) policy. For example, in the case where an image of a JPEG format is a still image shot by a camera, the image includes shooting option data such as data of the camera that has shot the image, a shooting date, an image size as well as image data for the still image.

As described above, since a conventional JPEG image additionally stores only EXIF data, only one Application specific data header (APP Header) of sixteen APP Headers, which are application spaces existing within the JPEG image, is used and the other APP headers are not used.

Therefore, there emerges a necessity of providing a more convenient function to a user using the unused APP Headers existing within the JPEG image.

SUMMARY OF THE INVENTION

An object of the present invention is to substantially solve at least the above problems and/or disadvantages and to provide at least the advantages below. Accordingly, an object of the present invention is to provide an apparatus and a method for inserting additional data into an image file in an electronic device.

Another object of the present invention is to provide an apparatus and a method for inserting additional data using a header within an image file in an electronic device.

Further another object of the present invention is to provide an apparatus and a method for inserting additional data into an image file in an electronic device to create a variety of multimedia data.

According to one aspect of the present invention; a method for inserting additional data into an image file in an electronic device, the method includes when an event of inserting additional data into the image file occurs, recording an identification code representing insertion of additional data in a corresponding header within the image file; and adding the additional data input by a user to an end portion of the image file.

According to another aspect of the present invention, a method for reproducing an image file into which additional data is inserted in an electronic device, the method includes when an event of reproducing the image file occurs, analyzing the image file to separate the image file into image data and the additional data; decoding the image data and the additional data; and reproducing the decoded image data and additional data.

According to further another aspect of the present invention, an apparatus for inserting additional data into an image file in an electronic device, the apparatus includes a storing unit for storing the image file; an input unit for receiving the additional data; and a data inserting unit for reading the image file from the storing unit, inserting the additional data into the image file when an event of inserting the additional data into the image file occurs.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, an apparatus and a method for inserting additional data into an image file using a header within the image file in an electronic device will be described in detail. The term "electronic device" refers to all electronic devices that can display an image file and receive data. Electronic devices in accordance with embodiments of the present invention may include mobile communication terminals. Description will be made using an image file having a JPEG format.

Figure 1:
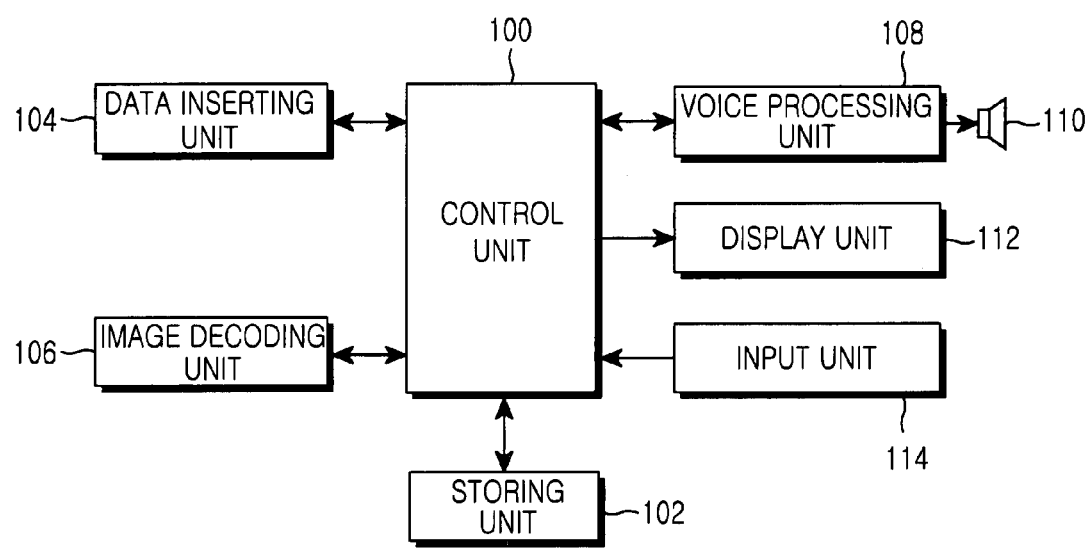
FIG. 1 is a diagram illustrating a construction of an electronic device according to the present invention.

FIG. 1 is a diagram illustrating a construction of an electronic device according to the present invention. The electronic device includes a control unit 100, a storing unit 102, a data inserting unit 104, an image decoding unit 106, a voice processing unit 108, a speaker 110, a display unit 112, and an input unit 114.

Referring to FIG. 1, the control unit 100 performs data communication, and process and control operations for inserting additional data into an image file. Particularly, when an event of inserting additional data into a predetermined image file occurs according to the present inventions the control unit 100 outputs the image file and additional data input by a user to the data inserting unit 104, receives the image file into which the additional data is inserted from the data inserting unit 104, and stores the same in the storing unit 102. When an event of reproducing an image file into which the additional data is inserted occurs, the control unit 106 reads the image file from the storing unit 102, provides the read image file to the image decoding unit 106, receives decoded image file data from the image decoding unit 106, and outputs the decoded data to the display unit 112 and the voice processing unit 108.

The storing unit 102 stores an image file and an image file with additional data to be input from the control unit 100.

Figure 3:
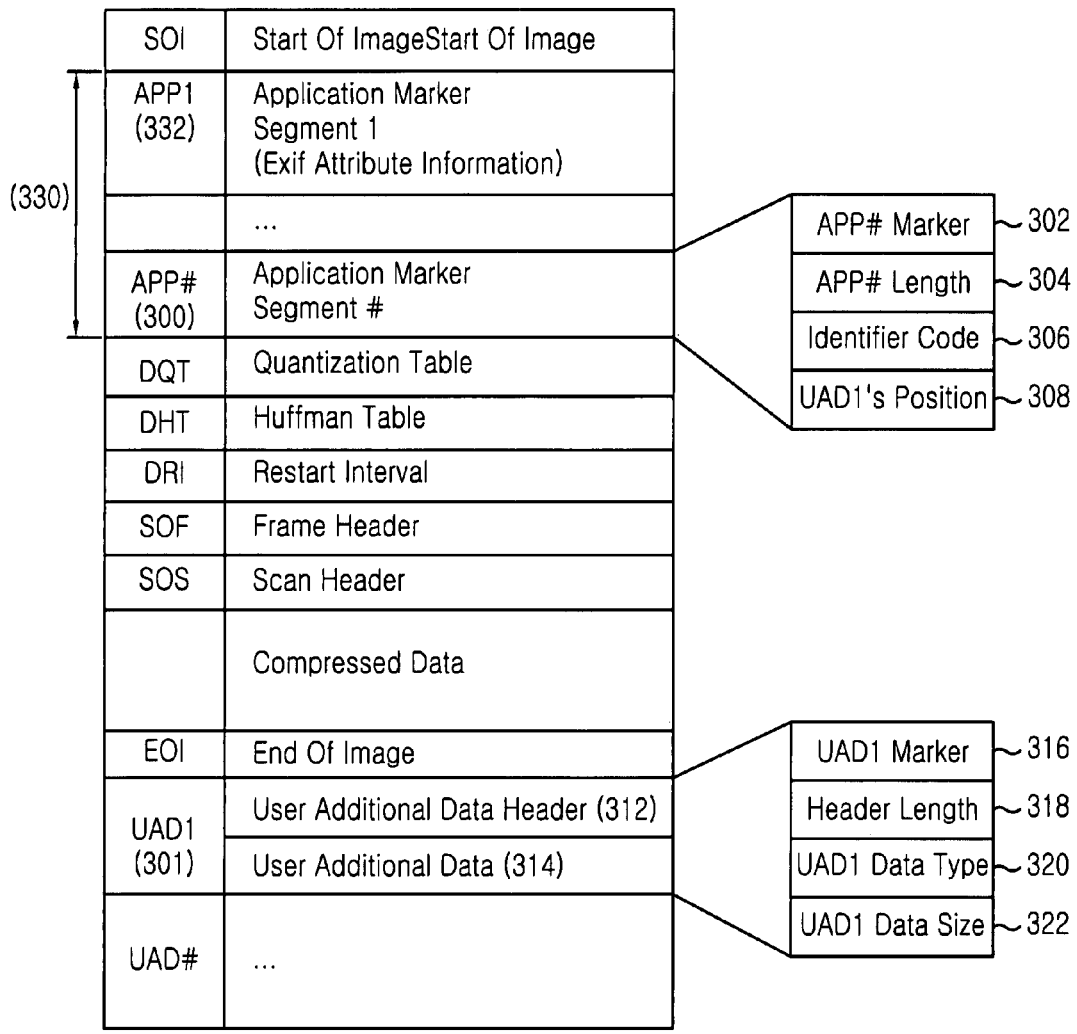
FIG. 3 is a diagram illustrating a structure of a JPEG image file into which additional data is inserted in an electronic device according to the present invention.

The data inserting unit 104 receives the image file and additional data input by a user from the control unit 100, and inserts the additional data into the image file using an APP header, which is an application space within the image file. Referring to FIG. 3, a code informing insertion of additional data is inserted to an APP# header 300 of the image file having a JPEG format, and the additional data is inserted in an end portion of the image file. The APP# header 300 means one APP header of the rest APP headers excluding an APP1 header 332 in which EXIF data is inserted among sixteen headers APP1-APP16 provided by the JPEG format.

The APP# header 300 includes an APP# marker field 302 dividing each APP header, an APP# length field 304 representing a length of data existing behind the APP# marker, an identifier code field 306 that can be identified by only a decoder capable of decoding additional data, and a UAD1's position field 308 representing a start position of data added by a user. The additional data includes a user additional data header field 312 and an actual user additional data (UAD) field 314, and can be inserted into the JPEG image file. The user additional data header field 312 can include an UAD# marker field 316 discriminating an order of the additional data, a header length field 318 representing a length of data existing behind the UAD# marker 316, a UAD# data type field 320 representing a type of the additional data, and a UAD# data size field 322 representing a size of the additional data. The APP# header is an application space identifying if additional data exists within the image file and the position of the additional data. Only one APP# header is used regardless of the number of data added to the image file. A user can constantly add additional data to the image file regardless of the size and the number of the data intended to be added.

The image decoding unit 106 analyzes an image file input from the control unit 100, separates the image file into JPEG image data and additional data added by a user, and decodes the two data to output the decoded data to the control unit 100.

The voice processing unit 108 is also referred to as a coder-decoder (CODEC), and outputs voice signals using the speaker 110 connected to the voice processing unit 108. For example, the voice processing unit 108 converts digital voice signals provided from the control unit 100 into analog voice signals, and transmits the converted signals using the speaker 110. The voice processing unit 108 receives decoded additional data from the control unit 100, and transmits the decoded data using the speaker 110 according to the present invention.

The display unit 112 displays state data occurring during an operation of an electronic device, and a limited number of characters. Particularly, the display unit 112 displays a window for receiving additional data and displays decoded JPEG image data and additional data input from the control unit 100 under control of the control unit 100 according to the present invention.

The input unit 114 includes a plurality of function keys, and provides data corresponding to a key pressed by a user to the control unit 100. Particularly, the input unit 114 receives data to be added to the image file and provides the data to the control unit 100 according to the present invention.

Figure 2:
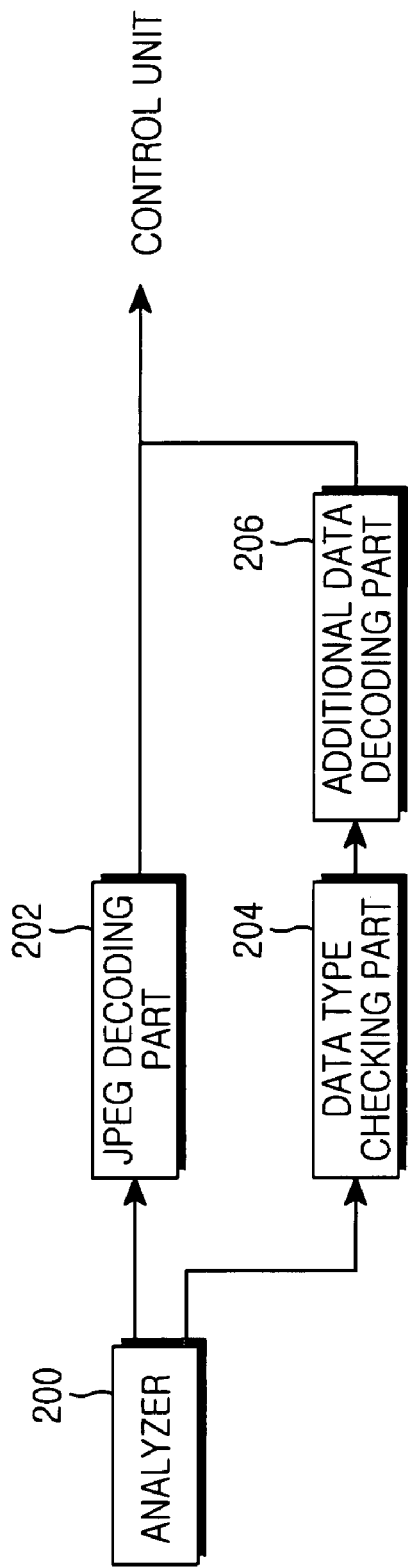
FIG. 2 is a diagram illustrating a detailed construction of an image decoding unit of an electronic device according to the present invention.

FIG. 2 is a diagram illustrating a detailed construction of an image decoding unit of an electronic device according to the present invention. The image decoding unit includes an analyzer 200, a JPEG decoding part 202, a data type checking part 204, and an additional data decoding part 206.

Referring to FIG. 2, the analyzer 200 receives from the control unit 100 an image file into which additional data is inserted, analyzes the received image file, and separates the received image file into JPEG image data and additional data. Referring to FIG. 3, the analyzer 200 checks the UAD1's position field 308 of the APP# header 300 from the image file to understand a position of the additional data, thereby separating the image file into the JPEG image data and the additional data. The analyzer 200 provides the separated JPEG image data to the JPEG decoder 202, and the separated additional data to the data type checking part 204.

The JPEG decoding part 202 decodes JPEG image data input from the analyzer using the JPEG decoder and outputs the decoded JPEG image data to the control unit 100.

The data type checking part 204 receives the separated additional data from the analyzer 200, checks a header of the additional data to check a data type (voice, music, a character string, and a special character string) of each additional data, and outputs the additional data and the checked data type to the additional data decoding part 206.

The additional data decoding part 206 decodes the additional data input from the data type checking part 204 appropriately for the checked data type to output the decoded data to the control unit 100. In the case where the additional data needs no decoding, the decoding operation may not be performed.

Figure 4:
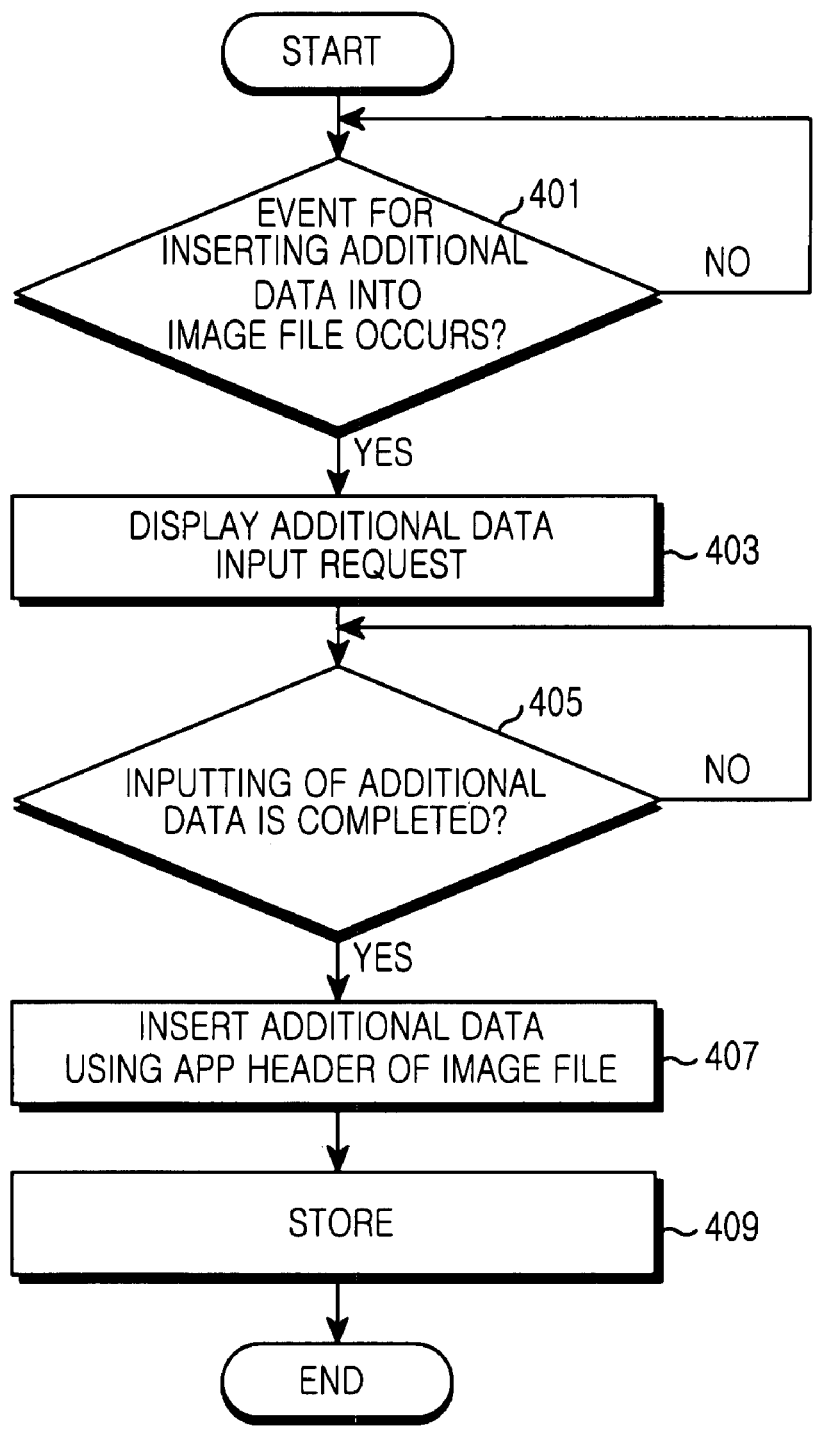
FIG. 4 is a diagram illustrating a procedure for inserting additional data into an JPEG image file in an electronic device according to the present invention.

FIG. 4 is a diagram illustrating a procedure for inserting additional data into a JPEG image file in an electronic device according to the present invention.

Referring to FIG. 4, the electronic device determines if an event for inserting additional data into a JPEG image file occurs in step 401. When the event for inserting additional data into the JPEG image file occurs, the electronic device displays a message requiring the input of one or more additional data in step 403. The additional data can include a music file, voice, and a character string. The character string can be given an image effect such as color, a size, and a font and a special effect (e.g., a character string blinking effect, a flow effect from left to right). For example, an effect can be set such that a music file is added to a photo shot using a portable terminal, a poem inserted in the photo to which the music file has been added, a character string of the input poem designated to a red color, and the character string flows from a lower end to an upper end of the image.

After that, the electronic device determines whether the input of the additional data is completed in a step 405. If it is determined that the input of the additional data is not complete in step 405, the procedure remains at step 405. However, if it is determined that the input of the additional data is complete in step 405, the procedure continues to step 407, where the electronic device inserts a code identifying that the additional data is inserted into an APP header within the JPEG image file, converts the input additional data to data of a format used for being added to the image file, and inserts the converted data into an end portion of the image file. For example, referring to FIG. 3, a code 306 identifying that additional data is inserted in an end portion of the image, and a code 308 informing a start position of the additional data is inserted into an APP# header 300 within the JPEG image file, and additional data input by a user is inserted.

After that, the electronic device stores the image file into which the additional data is inserted in the storing unit 102 in step 409, and ends an algorithm according to the present invention.

Figure 5:
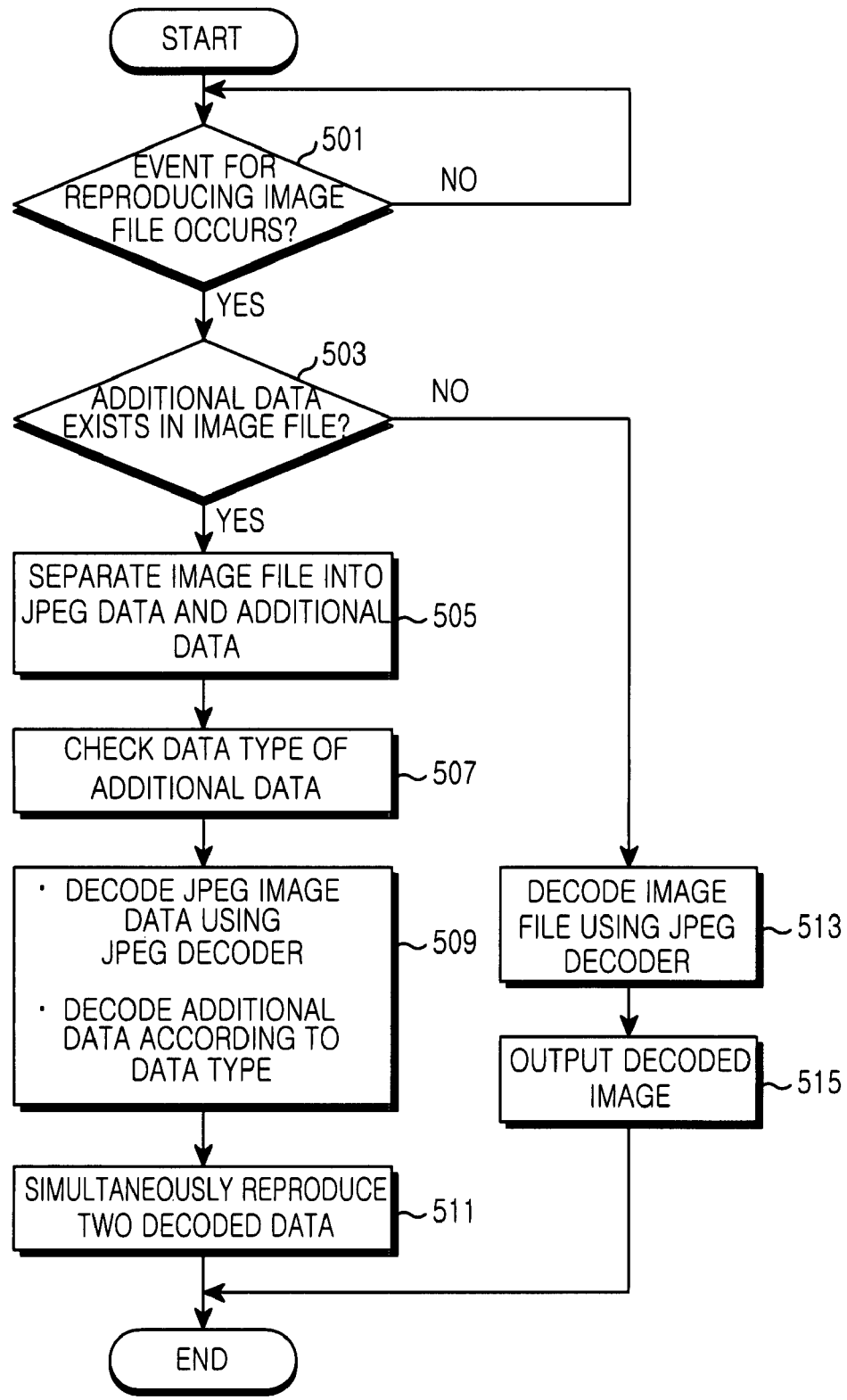
FIG. 5 is a diagram illustrating a procedure for reproducing a JPEG image file into which additional data is inserted in an electronic device according to the present invention.

FIG. 5 is a diagram illustrating a procedure for reproducing a JPEG image file into which additional data is inserted in an electronic device according to the present invention.

Referring to FIG. 5, the electronic device determines if an event for displaying or reproducing a image file occurs in step 501. When the event for displaying or reproducing the image file occurs, the electronic device checks an APP header of the image file to examine whether additional data exists in step 503. The electronic device determines if an APP header informing that additional data excluding an EXIF format is inserted into an APP header of the image file.

When there does not exist additional data in the image file, the electronic device decodes the image file using the JPEG decoder in step 513, and performs step 515 to display the decoded image file on the display unit 112.

When there does exist the additional data in the image file, the electronic device analyzes the image file in step 505 to separate the image file into JPEG image data and additional data. For example, referring to FIG. 3, the electronic device can separate the additional data from the image file by checking a position of the additional data in the UAD1's position field 308 of the APP# header 300.

The electronic device then checks a type of the separated additional data in step 507. For example, referring to FIG. 3, the electronic device can check the UAD1 data type field 320 from the additional data to check that a data type of the additional data is one of music, voice, a character string, and a special character string.

The electronic device decodes the JPEG image data using the JPEG decoder and decodes the additional data according to the checked data type in step 509. The electronic device performs step 511 to simultaneously output the decoded two data using the display unit 112 and the speaker 110.

For example, when a photo to which a music file is added is received in a portable terminal via multimedia message service (MMS), and a user selects a menu for reproducing the received photo, the portable terminal decodes the photo and the music file added thereto to simultaneously display the photo and reproduce the music file added thereto.

In the case where another electronic device, i.e., an electronic device that does not have a decoder, intends to reproduce the image file, a decoder of other electronic device ignores an APP header regarding additional data within the image file, so that only original JPEG image file can be displayed.

As described above, according to the present invention, an electronic device stores additional data desired by a user in an image file using a header within the image file, so that unique multimedia data where two or more data are combined can be created.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for inserting additional data into an image file in an electronic device, the method comprising the steps of:
when an event of inserting additional data into the image file occurs, displaying a message requiring input of additional data;
if the input of the additional data is completed by a user, recording an identification code representing insertion of the additional data in a corresponding header within the image file; and
adding the additional data to an end portion of the image file.

2. The method of claim 1, wherein the image file is a Joint Photographic Experts Group (JPEG) file.

3. The method of claim 2, wherein the header is one of a plurality of headers existing within the JPEG file.

4. The method of claim 1, wherein the header comprises at least one of a header identifier, a header length, the identification code, and a position of the additional data.

5. The method of claim 1, wherein at least one additional data is added to the image file.

6. The method of claim 1, wherein the additional data is at least one of music, voice, a character string, and a special character string.

7. The method of claim 1, further comprising:
when an event of reproducing the image file occurs, analyzing the image file to separate the image file into image data and the additional data;
decoding the image data and the additional data; and
reproducing the decoded image data and additional data.

8. The method of claim 7, wherein separating the image file into the image data and the additional data comprises:
determining a position of the additional data from the header within the image file; and
separating the image file into the image data and the additional data using the determined position.

9. An apparatus for inserting additional data into an image file in an electronic device, the apparatus comprising:
a storage unit for storing the image file;
a display unit for displaying a message requiring input of additional data;
an input unit for receiving the additional data from a user; and
a data inserting unit for reading the image file from the storage unit, recording an identification code representing insertion of the additional data in a corresponding header within the image file if the input of the additional data is completed by a user, and adding the additional date to an end portion of the image file when an event of inserting the additional data into the image file occurs.

10. The apparatus of claim 9, wherein the image file is a JPEG file.

11. The apparatus of claim 9, further comprising a decoding unit for analyzing the image file to separate the image file into image data and the additional data, and decoding the image data and the additional data to output the decoded data to a control unit, when an event of reproducing the image file occurs.

12. The apparatus of claim 11, wherein the decoding unit comprises:
an analyzer for determining a position of additional data from a header within an image file to separate the image file into image data and additional data;
an image data decoding part for decoding the image data and the additional data;
a data type checking part for determining a data type of the additional data; and
an additional data decoding part for decoding the additional data according to the determined data type.

13. The apparatus of claim 9, wherein the additional data is at least one of music, voice, a character string, and a special character string.

* * * * *